US008848973B2

(12) United States Patent
Fullerton et al.

(10) Patent No.: US 8,848,973 B2
(45) Date of Patent: Sep. 30, 2014

(54) SYSTEM AND METHOD FOR AUTHENTICATING AN OPTICAL PATTERN

(71) Applicant: Correlated Magnetics Research, LLC, New Hope, AL (US)

(72) Inventors: Larry W. Fullerton, New Hope, AL (US); Mark D. Roberts, Huntsville, AL (US); Robert Scott Evans, Austin, TX (US)

(73) Assignee: Correlated Magnetics Research LLC, Huntsville, AL (US)

( * ) Notice: Subject to any disclaimer, the term of this patent is extended or adjusted under 35 U.S.C. 154(b) by 0 days.

(21) Appl. No.: 13/928,126

(22) Filed: Jun. 26, 2013

(65) Prior Publication Data

US 2013/0284807 A1    Oct. 31, 2013

Related U.S. Application Data

(63) Continuation-in-part of application No. 13/240,335, filed on Sep. 22, 2011, now Pat. No. 8,648,681.

(60) Provisional application No. 61/664,581, filed on Jun. 26, 2012.

(51) Int. Cl.
*G06K 9/00* (2006.01)
*G06K 5/00* (2006.01)
*G01D 18/00* (2006.01)
*H01F 7/02* (2006.01)
*H01F 13/00* (2006.01)

(52) U.S. Cl.
CPC *G06K 5/00* (2013.01); *G01D 18/00* (2013.01); *H01F 7/0242* (2013.01); *H01F 7/0284* (2013.01); *H01F 13/003* (2013.01)
USPC ......... 382/100; 382/217; 382/218; 340/572.1

(58) Field of Classification Search
USPC ...................... 382/100, 217, 218; 340/572.1
See application file for complete search history.

(56) References Cited

U.S. PATENT DOCUMENTS 493,858 A    3/1893    Edison
687,292 A    11/1901   Armstrong
(Continued)

FOREIGN PATENT DOCUMENTS

CN    1615573 A    5/2005
DE    2938782 A1   4/1981
(Continued)

OTHER PUBLICATIONS

Atallah, K., Calverley, S.D., D. Howe, 2004, "Design, analysis and realisation of a high-performance magnetic gear", IEE Proc.-Electr. Power Appl., vol. 151, No. 2, Mar. 2004.

(Continued)

*Primary Examiner* — Ramon Barrera
(74) *Attorney, Agent, or Firm* — Vector IP Law Group; Robert S. Babayi

(57) ABSTRACT

A system for authenticating an optical pattern created by exposing a magnetically sensitive material to one or more magnetic field sources. The system includes illumination sources configured to illuminate the optical pattern, sensors configured to generate sensed optical characteristic data when the optical pattern is illuminated, a memory configured to store a reference optical data associated with a reference optical pattern, and a processor configured to access the memory and compare the reference optical data to the sensed optical characteristic data in order to authenticate the optical pattern.

28 Claims, 7 Drawing Sheets

(56) References Cited

U.S. PATENT DOCUMENTS

| | | | |
|---|---|---|---|
| 996,933 A | 7/1911 | Lindquist |
| 1,171,351 A | 2/1916 | Neuland |
| 1,236,234 A | 8/1917 | Troje |
| 2,243,555 A | 5/1941 | Faus |
| 2,389,298 A | 11/1945 | Ellis |
| 2,438,231 A | 3/1948 | Schultz |
| 2,471,634 A | 5/1949 | Vennice |
| 2,570,625 A | 10/1951 | Zimmerman et al. |
| 2,722,617 A | 11/1955 | Cluwen et al. |
| 2,932,545 A | 4/1960 | Foley |
| 3,055,999 A | 9/1962 | Lucas |
| 3,102,314 A | 9/1963 | Alderfer |
| 3,208,296 A | 9/1965 | Baermann |
| 3,238,399 A | 3/1966 | Johanees et al. |
| 3,288,511 A | 11/1966 | Tavano |
| 3,301,091 A | 1/1967 | Reese |
| 3,382,386 A | 5/1968 | Schlaeppi |
| 3,408,104 A | 10/1968 | Raynes |
| 3,468,576 A | 9/1969 | Beyer et al. |
| 3,474,366 A | 10/1969 | Barney |
| 3,521,216 A | 7/1970 | Tolegian |
| 3,645,650 A | 2/1972 | Laing |
| 3,668,670 A | 6/1972 | Andersen |
| 3,684,992 A | 8/1972 | Huguet et al. |
| 3,696,258 A | 10/1972 | Anderson et al. |
| 3,790,197 A | 2/1974 | Parker |
| 3,791,309 A | 2/1974 | Baermann |
| 3,802,034 A | 4/1974 | Bookless |
| 3,803,433 A | 4/1974 | Ingenito |
| 3,808,577 A | 4/1974 | Mathauser |
| 3,845,430 A | 10/1974 | Petkewicz et al. |
| 3,893,059 A | 7/1975 | Nowak |
| 4,079,558 A | 3/1978 | Gorham |
| 4,117,431 A | 9/1978 | Eicher |
| 4,129,846 A | 12/1978 | Yablochnikov |
| 4,209,905 A | 7/1980 | Gillings |
| 4,296,394 A | 10/1981 | Ragheb |
| 4,352,960 A | 10/1982 | Dormer et al. |
| 4,355,236 A | 10/1982 | Holsinger |
| 4,399,595 A | 8/1983 | Yoon et al. |
| 4,416,127 A | 11/1983 | Gomez-Olea Naveda |
| 4,453,294 A | 6/1984 | Morita |
| 4,535,278 A | 8/1985 | Asakawa |
| 4,547,756 A | 10/1985 | Miller et al. |
| 4,629,131 A | 12/1986 | Podell |
| 4,645,283 A | 2/1987 | MacDonald et al. |
| 4,680,494 A | 7/1987 | Grosjean |
| 381,968 A | 5/1988 | Tesla |
| 4,764,743 A | 8/1988 | Leupold et al. |
| 4,837,539 A | 6/1989 | Baker |
| 4,849,749 A | 7/1989 | Fukamachi et al. |
| 4,862,128 A | 8/1989 | Leupold |
| H000693 H | 10/1989 | Leupold |
| 4,893,103 A | 1/1990 | Leupold |
| 4,912,727 A | 3/1990 | Schubert |
| 4,941,236 A | 7/1990 | Sherman et al. |
| 4,956,625 A | 9/1990 | Cardone et al. |
| 4,993,950 A | 2/1991 | Mensor, Jr. |
| 4,994,778 A | 2/1991 | Leupold |
| 4,996,457 A | 2/1991 | Hawsey et al. |
| 5,013,949 A | 5/1991 | Mabe, Jr. |
| 5,020,625 A | 6/1991 | Yamauchi et al. |
| 5,050,276 A | 9/1991 | Pemberton |
| 5,062,855 A | 11/1991 | Rincoe |
| 5,123,843 A | 6/1992 | Van der Zel et al. |
| 5,179,307 A | 1/1993 | Porter |
| 5,213,307 A | 5/1993 | Perrillat-Amede |
| 5,302,929 A | 4/1994 | Kovacs |
| 5,309,680 A | 5/1994 | Kiel |
| 5,345,207 A | 9/1994 | Gebele |
| 5,367,891 A | 11/1994 | Furuyama |
| 5,383,049 A | 1/1995 | Carr |
| 5,394,132 A | 2/1995 | Poil |
| 5,399,933 A | 3/1995 | Tsai |
| 5,425,763 A | 6/1995 | Stemmann |
| 5,440,997 A | 8/1995 | Crowley |
| 5,461,386 A | 10/1995 | Knebelkamp |
| 5,492,572 A | 2/1996 | Schroeder et al. |
| 5,495,221 A | 2/1996 | Post |
| 5,512,732 A | 4/1996 | Yagnik et al. |
| 5,570,084 A | 10/1996 | Ritter et al. |
| 5,582,522 A | 12/1996 | Johnson |
| 5,604,960 A | 2/1997 | Good |
| 5,631,093 A | 5/1997 | Perry et al. |
| 5,631,618 A | 5/1997 | Trumper et al. |
| 5,633,555 A | 5/1997 | Ackermann et al. |
| 5,635,889 A | 6/1997 | Stelter |
| 5,637,972 A | 6/1997 | Randall et al. |
| 5,730,155 A | 3/1998 | Allen |
| 5,742,036 A * | 4/1998 | Schramm et al. ............ 235/449 |
| 5,759,054 A | 6/1998 | Spadafore |
| 5,788,493 A | 8/1998 | Tanaka et al. |
| 5,838,304 A | 11/1998 | Hall |
| 5,852,393 A | 12/1998 | Reznik et al. |
| 5,935,155 A | 8/1999 | Humayun et al. |
| 5,956,778 A | 9/1999 | Godoy |
| 5,983,406 A | 11/1999 | Meyerrose |
| 6,039,759 A | 3/2000 | Carpentier et al. |
| 6,047,456 A | 4/2000 | Yao et al. |
| 6,072,251 A | 6/2000 | Markle |
| 6,074,420 A | 6/2000 | Eaton |
| 6,115,849 A | 9/2000 | Meyerrose |
| 6,118,271 A | 9/2000 | Ely et al. |
| 6,120,283 A | 9/2000 | Cousins |
| 6,142,779 A | 11/2000 | Siegel et al. |
| 6,170,131 B1 | 1/2001 | Shin |
| 6,187,041 B1 | 2/2001 | Garonzik |
| 6,205,012 B1 | 3/2001 | Lear |
| 6,210,033 B1 | 4/2001 | Karkos, Jr. et al. |
| 6,224,374 B1 | 5/2001 | Mayo |
| 6,234,833 B1 | 5/2001 | Tsai et al. |
| 6,241,069 B1 | 6/2001 | Mazur et al. |
| 6,273,918 B1 | 8/2001 | Yuhasz et al. |
| 6,275,778 B1 | 8/2001 | Shimada et al. |
| 6,285,097 B1 | 9/2001 | Hazelton et al. |
| 6,387,096 B1 | 5/2002 | Hyde, Jr. |
| 6,457,179 B1 | 10/2002 | Prendergast |
| 6,467,326 B1 | 10/2002 | Garrigus |
| 6,535,092 B1 | 3/2003 | Hurley et al. |
| 6,540,515 B1 | 4/2003 | Tanaka |
| 6,599,321 B2 | 7/2003 | Hyde, Jr. |
| 6,607,304 B1 | 8/2003 | Lake et al. |
| 6,652,278 B2 | 11/2003 | Honkura et al. |
| 6,653,919 B2 | 11/2003 | Shih-Chung et al. |
| 6,720,698 B2 | 4/2004 | Galbraith |
| 6,747,537 B1 | 6/2004 | Mosteller |
| 6,842,332 B1 | 1/2005 | Rubenson et al. |
| 6,847,134 B2 | 1/2005 | Frissen et al. |
| 6,850,139 B1 | 2/2005 | Dettmann et al. |
| 6,862,748 B2 | 3/2005 | Prendergast |
| 6,864,773 B2 | 3/2005 | Perrin |
| 6,913,471 B2 | 7/2005 | Smith |
| 6,927,657 B1 | 8/2005 | Wu |
| 6,954,968 B1 | 10/2005 | Sitbon |
| 6,971,147 B2 | 12/2005 | Halstead |
| 7,016,492 B2 | 3/2006 | Pan et al. |
| 7,031,160 B2 | 4/2006 | Tillotson |
| 7,033,400 B2 | 4/2006 | Currier |
| 7,038,565 B1 | 5/2006 | Chell |
| 7,065,860 B2 | 6/2006 | Aoki et al. |
| 7,066,739 B2 | 6/2006 | McLeish |
| 7,066,778 B2 | 6/2006 | Kretzschmar |
| 7,101,374 B2 | 9/2006 | Hyde, Jr. |
| 7,137,727 B2 | 11/2006 | Joseph et al. |
| 7,186,265 B2 | 3/2007 | Sharkawy et al. |
| 7,224,252 B2 | 5/2007 | Meadow, Jr. et al. |
| 7,264,479 B1 | 9/2007 | Lee |
| 7,276,025 B2 | 10/2007 | Roberts et al. |
| 7,339,790 B2 | 3/2008 | Baker et al. |
| 7,362,018 B1 | 4/2008 | Kulogo et al. |
| 7,381,181 B2 | 6/2008 | Lau et al. |
| 7,402,175 B2 | 7/2008 | Azar |
| 7,438,726 B2 | 10/2008 | Erb |
| 7,444,683 B2 | 11/2008 | Prendergast et al. |

(56) References Cited

U.S. PATENT DOCUMENTS

| | | |
|---|---|---|
| 7,453,341 B1 | 11/2008 | Hildenbrand |
| 7,498,914 B2 | 3/2009 | Miyashita et al. |
| 7,583,500 B2 | 9/2009 | Ligtenberg et al. |
| 7,715,890 B2 | 5/2010 | Kim et al. |
| 7,775,567 B2 | 8/2010 | Ligtenberg et al. |
| 7,796,002 B2 | 9/2010 | Hashimoto et al. |
| 7,808,349 B2 | 10/2010 | Fullerton et al. |
| 7,812,697 B2 | 10/2010 | Fullerton et al. |
| 7,817,004 B2 | 10/2010 | Fullerton et al. |
| 7,832,897 B2 | 11/2010 | Ku |
| 7,837,032 B2 | 11/2010 | Smeltzer |
| 7,839,246 B2 | 11/2010 | Fullerton et al. |
| 7,843,297 B2 | 11/2010 | Fullerton et al. |
| 7,868,721 B2 | 1/2011 | Fullerton et al. |
| 7,874,856 B1 | 1/2011 | Schriefer et al. |
| 7,889,037 B2 | 2/2011 | Cho |
| 7,903,397 B2 | 3/2011 | McCoy |
| 7,905,626 B2 | 3/2011 | Shantha et al. |
| 8,002,585 B2 | 8/2011 | Zhou |
| 8,099,964 B2 | 1/2012 | Saito et al. |
| 2002/0125977 A1 | 9/2002 | VanZoest |
| 2003/0136837 A1 | 7/2003 | Amon et al. |
| 2003/0170976 A1 | 9/2003 | Molla et al. |
| 2003/0179880 A1 | 9/2003 | Pan et al. |
| 2003/0187510 A1 | 10/2003 | Hyde |
| 2004/0003487 A1 | 1/2004 | Reiter |
| 2004/0155748 A1 | 8/2004 | Steingroever |
| 2004/0244636 A1 | 12/2004 | Meadow et al. |
| 2004/0251759 A1 | 12/2004 | Hirzel |
| 2005/0102802 A1 | 5/2005 | Sitbon et al. |
| 2005/0196484 A1 | 9/2005 | Khoshnevis |
| 2005/0231046 A1 | 10/2005 | Aoshima |
| 2005/0240263 A1 | 10/2005 | Fogarty et al. |
| 2005/0263549 A1 | 12/2005 | Scheiner |
| 2005/0283839 A1* | 12/2005 | Cowburn ..................... 726/26 |
| 2006/0066428 A1 | 3/2006 | McCarthy et al. |
| 2006/0189259 A1 | 8/2006 | Park et al. |
| 2006/0198047 A1 | 9/2006 | Xue et al. |
| 2006/0198998 A1 | 9/2006 | Raksha et al. |
| 2006/0214756 A1 | 9/2006 | Elliott et al. |
| 2006/0290451 A1 | 12/2006 | Prendergast et al. |
| 2006/0293762 A1 | 12/2006 | Schulman et al. |
| 2007/0072476 A1 | 3/2007 | Milan |
| 2007/0075594 A1 | 4/2007 | Sadler |
| 2007/0103266 A1 | 5/2007 | Wang et al. |
| 2007/0138806 A1 | 6/2007 | Ligtenberg et al. |
| 2007/0255400 A1 | 11/2007 | Parravicini et al. |
| 2008/0119250 A1 | 5/2008 | Cho et al. |
| 2008/0139261 A1 | 6/2008 | Cho et al. |
| 2008/0174392 A1 | 7/2008 | Cho |
| 2008/0181804 A1 | 7/2008 | Tanigawa et al. |
| 2008/0186683 A1 | 8/2008 | Ligtenberg et al. |
| 2008/0218299 A1 | 9/2008 | Arnold |
| 2008/0224806 A1 | 9/2008 | Ogden et al. |
| 2008/0272868 A1 | 11/2008 | Prendergast et al. |
| 2008/0282517 A1 | 11/2008 | Claro |
| 2009/0021333 A1 | 1/2009 | Fiedler |
| 2009/0209173 A1 | 8/2009 | Arledge et al. |
| 2009/0250576 A1 | 10/2009 | Fullerton et al. |
| 2009/0251256 A1 | 10/2009 | Fullerton et al. |
| 2009/0254196 A1 | 10/2009 | Cox et al. |
| 2009/0278642 A1 | 11/2009 | Fullerton et al. |
| 2009/0289090 A1 | 11/2009 | Fullerton et al. |
| 2009/0289749 A1 | 11/2009 | Fullerton et al. |
| 2009/0292371 A1 | 11/2009 | Fullerton et al. |
| 2010/0033280 A1 | 2/2010 | Bird et al. |
| 2010/0126857 A1 | 5/2010 | Polwart et al. |
| 2010/0167576 A1 | 7/2010 | Zhou |
| 2011/0026203 A1 | 2/2011 | Ligtenberg et al. |
| 2011/0085157 A1 | 4/2011 | Bloss et al. |
| 2011/0101088 A1 | 5/2011 | Marguerettaz et al. |
| 2011/0210636 A1 | 9/2011 | Kuhlmann-Wilsdorf |
| 2011/0234344 A1 | 9/2011 | Fullerton et al. |
| 2011/0248806 A1 | 10/2011 | Michael |
| 2011/0279206 A1 | 11/2011 | Fullerton et al. |
| 2012/0064309 A1 | 3/2012 | Kwon et al. |

FOREIGN PATENT DOCUMENTS

| | | |
|---|---|---|
| EP | 0 345 554 A1 | 12/1989 |
| EP | 0 545 737 A1 | 6/1993 |
| FR | 823395 A | 1/1938 |
| GB | 1 495 677 A | 12/1977 |
| JP | S57-055908 U | 4/1982 |
| JP | S57-189423 U | 12/1982 |
| JP | 60-091011 U | 6/1985 |
| JP | 60-221238 A | 11/1985 |
| JP | 2001-328483 A | 11/2001 |
| JP | 05-038123 B2 | 10/2012 |
| WO | WO-02/31945 A2 | 4/2002 |
| WO | WO-2007/081830 A2 | 7/2007 |
| WO | WO-2009/124030 A1 | 10/2009 |
| WO | WO-2010/141324 A1 | 12/2010 |

OTHER PUBLICATIONS

Atallah, K., Howe, D. 2001, "A Novel High-Performance Magnetic Gear", IEEE Transactions on Magnetics, vol. 37, No. 4, Jul. 2001, p. 2844-2846.

Bassani, R., 2007, "Dynamic Stability of Passive Magnetic Bearings", Nonlinear Dynamics, V. 50, p. 161-68.

BNS 33 Range, Magnetic safety sensors, Rectangular design, referenced Jun. 2010 http://www.farnell.com/datasheets/36449.pdf, 3 pages, date unknown.

Boston Gear 221S-4, One-stage Helical Gearbox, http://www.bostongear.com/pdf/product_sections/200_series_helical.pdf.

Charpentier et al., 2001, "Mechanical Behavior of Axially Magnetized Permanent-Magnet Gears", IEEE Transactions on Magnetics, vol. 37, No. 3, May 2001, p. 1110-17.

Chau et al., 2008, "Transient Analysis of Coaxial Magnetic Gears Using Finite Element Comodeling", Journal of Applied Physics, vol. 103.

Choi et al., 2010, "Optimization of Magnetization Directions in a 3-D Magnetic Structure", IEEE Transactions on Magnetics, vol. 46, No. 6, Jun. 2010, p. 1603-06.

Correlated Magnetics Research, 2009, Online Video, "Innovative Magnetics Research in Huntsville", http://www.youtube.com/watch?v=m4m81JjZCJo.

Correlated Magnetics Research, 2009, Online Video, "Non-Contact Attachment Utilizing Permanent Magnets", http://www.youtube.com/watch?v=3xUm25CNNgQ.

Correlated Magnetics Research, 2010, Company Website, http://www.correlatedmagnetics.com.

Furlani 1996, "Analysis and optimization of synchronous magnetic couplings", J. Appl. Phys., vol. 79, No. 8, p. 4692.

Furlani 2001, "Permanent Magnet and Electromechanical Devices", Academic Press, San Diego.

Furlani, E.P., 2000, "Analytical analysis of magnetically coupled multipole cylinders", J. Phys. D: Appl. Phys., vol. 33, No. 1, p. 28-33.

General Electric DP 2.7 Wind Turbine Gearbox, http://www.gedrivetrain.com/insideDP27.cfm, referenced Jun. 2010.

Ha et al., 2002, "Design and Characteristic Analysis of Non-Contact Magnet Gear for Conveyor by Using Permanent Magnet", Conf. Record of the 2002 IEEE Industry Applications Conference, p. 1922-27.

Huang et al., 2008, "Development of a Magnetic Planetary Gearbox", IEEE Transactions on Magnetics, vol. 44, No. 3, p. 403-12.

International Search Report and Written Opinion dated Jun. 1, 2009, directed to counterpart application No. PCT/US2009/002027. (10 pages).

International Search Report and Written Opinion of the International Searching Authority issued in Application No. PCT/US12/61938 dated Feb. 26, 2013.

International Search Report and Written Opinion of the International Searching Authority issued in Application No. PCT/US2013/028095 dated May 13, 2013.

(56) References Cited

OTHER PUBLICATIONS

International Search Report and Written Opinion, dated Apr. 8, 2011 issued in related International Application No. PCT/US2010/049410.
International Search Report and Written Opinion, dated Aug. 18, 2010, issued in related International Application No. PCT/US2010/036443.
International Search Report and Written Opinion, dated Jul. 13, 2010, issued in related International Application No. PCT/US2010/021612.
International Search Report and Written Opinion, dated May 14, 2009, issued in related International Application No. PCT/US2009/038925.
Jian et al., "Comparison of Coaxial Magnetic Gears With Different Topologies", IEEE Transactions on Magnetics, vol. 45, No. 10, Oct. 2009, p. 4526-29.
Jian, L., Chau, K.T., 2010, "A Coaxial Magnetic Gear With Halbach Permanent-Magnet Arrays", IEEE Transactions on Energy Conversion, vol. 25, No. 2, Jun. 2010, p. 319-28.
Jørgensen et al., "The Cycloid Permanent Magnetic Gear", IEEE Transactions on Industry Applications, vol. 44, No. 6, Nov./Dec. 2008, p. 1659-65.
Jørgensen et al., 2005, "Two dimensional model of a permanent magnet spur gear", Conf. Record of the 2005 IEEE Industry Applications Conference, p. 261-5.
Kim, "A future cost trends of magnetizer systems in Korea", Industrial Electronics, Control, and Instrumentation, 1996, vol. 2, Aug. 5, 1996, pp. 991-996.
Krasil'nikov et al., 2008, "Calculation of the Shear Force of Highly Coercive Permanent Magnets in Magnetic Systems With Consideration of Affiliation to a Certain Group Based on Residual Induction", Chemical and Petroleum Engineering, vol. 44, Nos. 7-8, p. 362-65.
Krasil'nikov et al., 2009, "Torque Determination for a Cylindrical Magnetic Clutch", Russian Engineering Research, vol. 29, No. 6, pp. 544-547.
Liu et al., 2009, "Design and Analysis of Interior-magnet Outer-rotor Concentric Magnetic Gears", Journal of Applied Physics, vol. 105.
Lorimer, W., Hartman, A., 1997, "Magnetization Pattern for Increased Coupling in Magnetic Clutches", IEEE Transactions on Magnetics, vol. 33, No. 5, Sep. 1997.
Mezani, S., Atallah, K., Howe, D., 2006, "A high-performance axial-field magnetic gear", Journal of Applied Physics vol. 99.
Mi, "Magnetreater/Charger Model 580" Magnetic Instruments Inc. Product specification, May 4, 2009, http://web.archive.org/web/20090504064511/http://www.maginst.com/specifications/580_magnetreater.htm, 2 pages.
Neugart PLE-160, One-Stage Planetary Gearbox, http://www.neugartusa.com/ple_160_gb.pdf, referenced Jun. 2010.
Series BNS, Compatible Series AES Safety Controllers, http://www.schmersalusa.com/safety_controllers/drawings/aes.pdf, pp. 159-175, date unknown.
Series BNS-B20, Coded-Magnet Sensorr Safety Door Handle, http://www.schmersalusa.com/catalog_pdfs/BNS_B20.pdf, 2pages, date unknown.
Series BNS333, Coded-Magnet Sensors with Integral Safety Control Module, http://www.schmersalusa.com/machine_guarding/coded_magnet/drawings/bns333.pdf, 2 pages, date unknown.
Tsurumoto 1992, "Basic Analysis on Transmitted Force of Magnetic Gear Using Permanent Magnet", IEEE Translation Journal on Magnetics in Japan, Vo 7, No. 6, Jun. 1992, p. 447-52.
United States Office Action issued in U.S. Appl. No. 13/104,393 dated Apr. 4, 2013.
United States Office Action issued in U.S. Appl. No. 13/236,413 dated Jun. 6, 2013.
United States Office Action issued in U.S. Appl. No. 13/246,584 dated May 16, 2013.
United States Office Action issued in U.S. Appl. No. 13/374,074 dated Feb. 21, 2013.
United States Office Action issued in U.S. Appl. No. 13/430,219 dated Aug. 13, 2013.
United States Office Action issued in U.S. Appl. No. 13/470,994 dated Aug. 8, 2013.
United States Office Action issued in U.S. Appl. No. 13/470,994 dated Jan. 7, 2013.
United States Office Action issued in U.S. Appl. No. 13/529,520 dated Sep. 28, 2012.
United States Office Action issued in U.S. Appl. No. 13/530,893 dated Mar. 22, 2013.
United States Office Action issued in U.S. Appl. No. 13/855,519 dated Jul. 17, 2013.
United States Office Action issued in U.S. Appl. No. 12/206,270, dated Aug. 26, 2011.
United States Office Action issued in U.S. Appl. No. 12/476,952, dated Feb. 2, 2011.
United States Office Action, issued in U.S. Appl. No. 12/206,270 dated Mar. 12, 2012.
United States Office Action issued in U.S. Appl. No. 13/371,280 dated Mar. 9, 2012.
United States Office Action issued in U.S. Appl. No. 12/476,952 dated Oct. 12, 2011.
Wikipedia, "Barker Code", Web article, last modified Aug. 2, 2008, 2 pages.
Wikipedia, "Bitter Electromagnet", Web article, last modified Aug. 2011, 1 page.
Wikipedia, "Costas Array", Web article, last modified Oct. 7, 2008, 4 pages.
Wikipedia, "Gold Code", Web article, last modified Jul. 27, 2008, 1 page.
Wikipedia, "Golomb Ruler", Web article, last modified Nov. 4, 2008, 3 pages.
Wikipedia, "Kasami Code", Web article, last modified Jun. 11, 2008, 1 page.
Wikipedia, "Linear feedback shift register", Web article, last modified Nov. 11, 2008, 6 pages.
Wikipedia, "Walsh Code", Web article, last modified Sep. 17, 2008, 2 pages.
International Search Report and Written Opinion of the International Searching Authority issued in Application No. PCT/US2013/047986 dated Nov. 21, 2013.
United States Office Action issued in U.S. Appl. No. 13/246,584 dated Oct. 15, 2013.
United States Office Action issued in U.S. Appl. No. 13/470,994 dated Nov. 8, 2013.
United States Office Action issued in U.S. Appl. No. 13/530,893 dated Oct. 29, 2013.

* cited by examiner

US 8,848,973 B2

SYSTEM AND METHOD FOR AUTHENTICATING AN OPTICAL PATTERN

CLAIMING BENEFIT OF PRIOR FILED U.S. APPLICATIONS

This Non-provisional Patent Application is a continuation-in-part of U.S. application Ser. No. 13/240,335, filed Sep. 22, 2011, titled "MAGNETIC STRUCTURE PRODUCTION", and claims the benefit of U.S. Provisional Patent Application 61/664,581, filed Jun. 26, 2012, titled "AUTHENTICATION SYSTEM AND METHOD", which are incorporated by reference herein in their entirety.

FIELD OF THE INVENTION

The present invention relates generally to a system and method for authentication. More particularly, the present invention relates to a system and method for authentication of an optical pattern produced using a magnetic structure.

BACKGROUND OF THE INVENTION

For counterfeiting prevention, systems and methods for authenticating of components are known. Counterfeiting of components may involve repurposing, remarking or recycling used components along a supply chain. As such, a counterfeit component may pass all production testing, but its reliability may be affected because the part may be near the end of its useful life when it is installed. For this reason, counterfeit components pose a very high risk especially when such components are used in sensitive applications, such as national defense, military or intelligence.

Known marking, authentication and anti-counterfeiting technologies use taggants comprising chemical or physical markers. Some taggants consist of microscopic particles built up in many layers, which are made of different materials. Other taggants can be engineered particles with unique structures, chemical signatures, photo emission characteristics or combinations of these that can be added to plastics or inks. Unique micro-structures can be read using microscopes. Chemicals or nano-structures that have spectral-shift characteristics can be illuminated and read by specially tuned readers. But readers that must be matched to specific taggants limit the variation that can be applied to components and the options for reading them.

For example, Authentix™ (www.authentix.com) has commercialized several taggant technologies and offers authentication and security solutions for food, pharmaceutical and manufactured goods. Authentix's taggant technology uses magnetic ink that includes magnetic particles that are applied to individual components. InkSure™ (www.inksure.com) has developed a unique chemical signature technology that is recognized by US courts as a viable, forensic method for identifying material sources. Applied DNA Sciences (www.adnas.com) offers marking and authentication solutions based on chemically modified (and inherently randomized) botanical DNA. This technology adds phosphors to marking solutions for low-level authentication and use well-developed DNA sequencing technologies to verify the authenticity of marked components. 3M offers a line of holographic authentication products that can be added to products or packaging.

One known authentication system and method described in U.S. Pat. No. 8,286,551 uses pieces of magnetic material to produce magnetic fields for orienting pigments in ink. Under this prior art, a printing machine has a transfer system for conveying a substrate onto an impression cylinder. A screen of cylindrical or flat shape with a doctor blade, collaborates with the impression cylinder to print the substrate with an ink containing pigments that can be orientated by a magnetic field. An unloading system carries the substrate away. The impression cylinder has a magnetic element on its impression surface, that is positioned at a point corresponding to impression performed by the screen on the substrate.

Currently available authentication techniques, however, offer partial solutions and cannot be broadly deployed across complex supply chains. For example, the processes of creating complex chemical signatures such as DNA occur in centralized facilities in batches. This limits the number of changes that can be made to the marking other than varying concentrations of multiple batches during component marking. Use of magnetic pieces is cumbersome and not easily varied. Ideally, a complete authentication would be changeable more frequently and not require the synthesis of complex chemicals, micro-scale printing or fixed micro-scale structures or magnetic pieces. DNA-based authentication requires removing a sample of the DNA-bearing material to detect the presence of the correct code using laboratory sequencing machines. Further, authentication that requires laboratories limits the ability to increase inspection.

Ideally, a marking technology would contain enough information to provide authentication and be expensive to copy, but not require laboratory analysis. Holographic printing techniques are widely available, but can be mimicked and have costs that are well over 0.01 per component.

Thus, there exists a need to inexpensively deliver secure authentication, rapid, automated screening throughout the supply chain and ultimately facilitate the elimination of purchases containing counterfeit components.

SUMMARY OF THE INVENTION

In accordance with one embodiment of the invention, a system and method authenticates an optical pattern created by exposing a magnetically sensitive material, for example a magnetically sensitive coating, to one or more magnetic field sources, such as permanent magnets, electromagnets or electro permanent magnets. The magnetically sensitive material can comprise flexible or rigid material. Magnetically sensitive coatings such as dichroic paint, a colloidal nanocrystal structure, or superparamagnetic photonic crystals may be used for creating the optical pattern by curing, fixing or setting the magnetically sensitive coating. The optical pattern is illuminated by one or more illumination sources to generate sensed optical characteristic data from one or more sensors such as photodetectors, photocells, photodiodes, fiber optics, pyrometers, proximity detectors, or infrared sensors. A memory is configured to store reference optical data. The reference optical data is associated with a reference optical pattern created by exposing a reference magnetically sensitive material to one or more reference magnetic field sources, and corresponds to data generated by one or more reference sensors when the reference optical pattern is illuminated by one or more reference illumination sources. In order to authenticate the optical pattern, the reference optical data is compared to the sensed optical characteristic data by a processor that is configured to access the memory.

According to some of the more detailed features of the invention, the optical characteristic data can correspond to physical attributes of the optical pattern, such as lattice structures of magnetically sensitive particles suspended in the magnetically sensitive material or a dichroic characteristic of the magnetically sensitive material. The optical characteristic data can also correspond to illumination attributes of the one or more illumination sources, such as intensity, propagation direction, frequency, wavelength, polarization or illumination angle. The optical characteristic data can also correspond to magnetic attributes of the one or more magnetic field sources such as position of the one or more magnetic field sources relative to a reference coordinate as well as size, shape, polarity or field strength of the one or more magnetic field sources. In one embodiment, the magnetic attributes of the one or more magnetic field sources can be varied over time for demodulating information conveyed by the optical pattern. The optical characteristic data can also correspond to orientation of the one or more illumination sources or the sensors.

According to other more detailed features of the invention, the optical pattern is created on a surface area that comprises the one or more magnetic field sources. The magnetic field sources can be arranged in a pattern in accordance with a code, such as Barker code, Gold code, Kasami code, Costas code, or pseudorandom code. The surface area can comprise overlapping magnetic field sources or magnetic field sources separated by non-magnetized regions.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
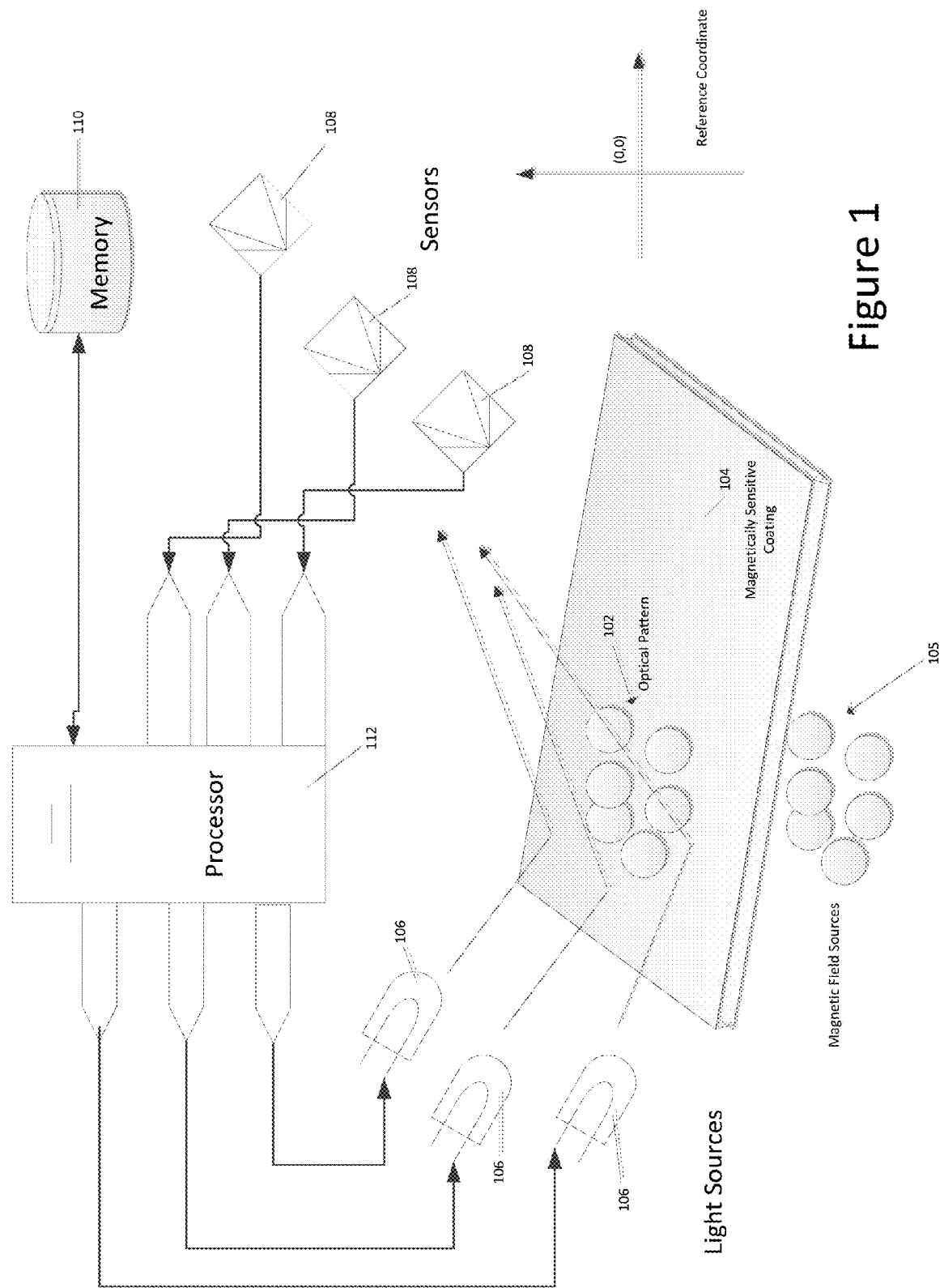
FIG. 1 depicts one embodiment of an authentication system for authenticating an optical pattern according to one aspect of the present invention.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

Certain described embodiments may relate, by way of example but not limitation, to systems and/or apparatuses comprising magnetic structures, methods for using magnetic structures, magnetic structures produced via magnetic printing, magnetic structures comprising arrays of discrete magnetic elements, combinations thereof, and so forth. Material presented herein may relate to and/or be implemented in conjunction with systems and methods described in U.S. Pat. No. 7,681,256 issued Mar. 23, 2010, U.S. Pat. No. 7,750,781 issued Jul. 6, 2010, U.S. Pat. No. 7,755,462 issued Jul. 13, 2010, U.S. Pat. No. 7,800,471 issued on Sep. 21, 2010, U.S. Pat. No. 7,812,698 issued Oct. 12, 2010, U.S. Pat. No. 8,115,581 issued on Feb. 14, 2012, U.S. Pat. No. 7,817,002, U.S. Pat. No. 7,817,003, U.S. Pat. No. 7,817,004, U.S. Pat. No. 7,817,005, and U.S. Pat. No. 7,817,006 issued Oct. 19, 2010, U.S. Pat. No. 7,821,367 issued Oct. 26, 2010, U.S. Pat. Nos. 7,823,300 and 7,824,083 issued Nov. 2, 2011, U.S. Pat. No. 7,834,729 issued Nov. 16, 2011, U.S. Pat. No. 7,839,247 issued Nov. 23, 2010, U.S. Pat. No. 7,843,295, U.S. Pat. No. 7,843,296, and U.S. Pat. No. 7,843,297 issued Nov. 30, 2010, No. 7,868,721 issued on Jan. 11, 2011, U.S. Pat. No. 7,893,803 issued Feb. 22, 2011, U.S. Pat. Nos. 7,956,711 and 7,956,712 issued Jun. 7, 2011, U.S. Pat. No. 7,958,575, U.S. Pat. Nos. 7,961,068 and 7,961,069 issued Jun. 14, 2011, U.S. Pat. No. 7,963,818 issued Jun. 21, 2011, U.S. Pat. No. 7,982,568 issued Jul. 19, 2011, U.S. Pat. Nos. 8,015,752 and 8,016,330 issued Sep. 13, 2011, U.S. Pat. No. 8,035,260 issued Oct. 11, 2011, and U.S. Pat. No. 8,222,986 issued on Jul. 17, 2012, which are all incorporated by reference herein in their entirety.

The present invention uses an optical pattern created on magnetically sensitive material for marking components that is impractical, if not virtually impossible, for a counterfeiter to copy. The coating inexpensively withstands normal component handling and usage without significant deterioration while offering a verification process that is not cost or time prohibitive. One such coating system and method is disclosed in U.S. application Ser. No. 13/240,335, filed Sep. 22, 2011, titled Magnetic Structure Production, which is hereby incorporated by reference in its entirety. As disclosed, a magnetizable material that is non-magnetized is brought into proximity with a magnetic-field-sensitive solution or other substance (e.g., an iron oxide solution of superparamagnetic photonic crystals). Proximity may be achieved by, for example, suspending particles in a liquid or applying a solution to a surface of the panel using, for instance, a paint having photonic crystals. Objects having magnetic paint may be magnetized with a pattern that may then be optically recognized by a camera or other optical recognition device. Light sources may be controlled to cause different magnetic field attributes to appear or be enhanced.

FIG. 1 shows an embodiment of an authentication system 100 for authenticating an optical pattern 102 according to one aspect of the present invention. The optical pattern 102 is created by exposing a magnetically sensitive coating 104 to one or more magnetic field sources 105. The magnetically sensitive coating 104 may include, for example, a dichroic paint, Colloidal Nanocrystal Clusters such as COLR™ Technology, superparamagnetic photonic crystals, or the like. Exposing the magnetically sensitive coating 104 to the one or more magnetic field sources 105, for example, comprising permanent magnets, electromagnets or electro permanent magnets, can affect physical attributes of the optical pattern 102. In one embodiment, the physical attributes of optical pattern 102 can be associated with one or more lattice structures of magnetically sensitive particles suspended in magnetically sensitive coating 104. For example, when a magnetic field is applied to COLR™ Technology, individual particles self-assemble to form a microscopic, lattice-like structure which diffracts specific wavelengths of light. Adjusting the strength of the magnetic field tunes the color to display brilliant, iridescent colors across the entire visible spectrum and beyond. The particles used in COLR™ Technology are iron oxide superparamagnetic Colloidal Nanocrystal Clusters (CNC) created using a wet synthesis process.

In another embodiment, the physical attributes of the optical pattern 102 are associated with dichroic characteristics of magnetically sensitive coating 104. Such dichroic characteristics act as a very accurate color filter used to selectively pass light of a small range of colors while reflecting other colors. When light strikes the coating at an angle, some of the light is reflected from the top surface of the coating, and some is reflected from the bottom surface where it is in contact with a surface. Because the light reflecting from the bottom travels a slightly longer path, some light wavelengths are reinforced by this delay, while others tend to be canceled, producing visible colors The system 100 operates under the control of one more processors 112 having access to one or more memory devices 110 that store programs for operating the system as well as data used for authenticating the optical pattern. The system 100 further comprises one or more illumination sources 106, which are configured to illuminate the optical pattern 102. Illumination sources 106 can be located at any location relative to a reference coordinate system, and can be configured to have a particular orientation relative to such reference coordinate system. The illumination sources can be associated with illumination characteristics such as intensity, propagation direction, frequency or wavelength spectrum, illumination angle, and polarization, where one or more illumination characteristics of a given illumination source 106 may or may not be varied. Under one embodiment shown in FIG. 1, the illumination characteristics may be varied under the control of the processor 112.

One or more sensors 108 sense optical characteristics resulting from reflection of light rays on the optical pattern 102 to generate sensed optical characteristic data. Such data is provided to the processor 112 when the optical pattern is illuminated by illumination sources 106. The sensors 108 may comprise photodetectors (e.g., photocells, photodiodes, transistors, etc.), fiber optic, pyrometer, proximity detector, infrared sensor, or any other optical sensor technology. The sensors 108 can be located at any location relative to the reference coordinate system, and can be and configured to have a particular orientation relative to the reference coordinate system. The sensors 108 may collect information at specific measurement times that may be at regular time intervals, random times, or at times determined using any other data sampling scheme.

The sensed optical characteristic data can correspond to, for example, physical attributes of the optical pattern 102 created on the magnetically sensitive coating 104, illumination attributes of one or more illumination sources 106, magnetic attributes of the one or more magnetic field sources 105, an orientation of at least one of the one or more illumination sources 106 or an orientation of at least one of the one or more sensors 108 relative to the reference coordinates.

Figure 2:
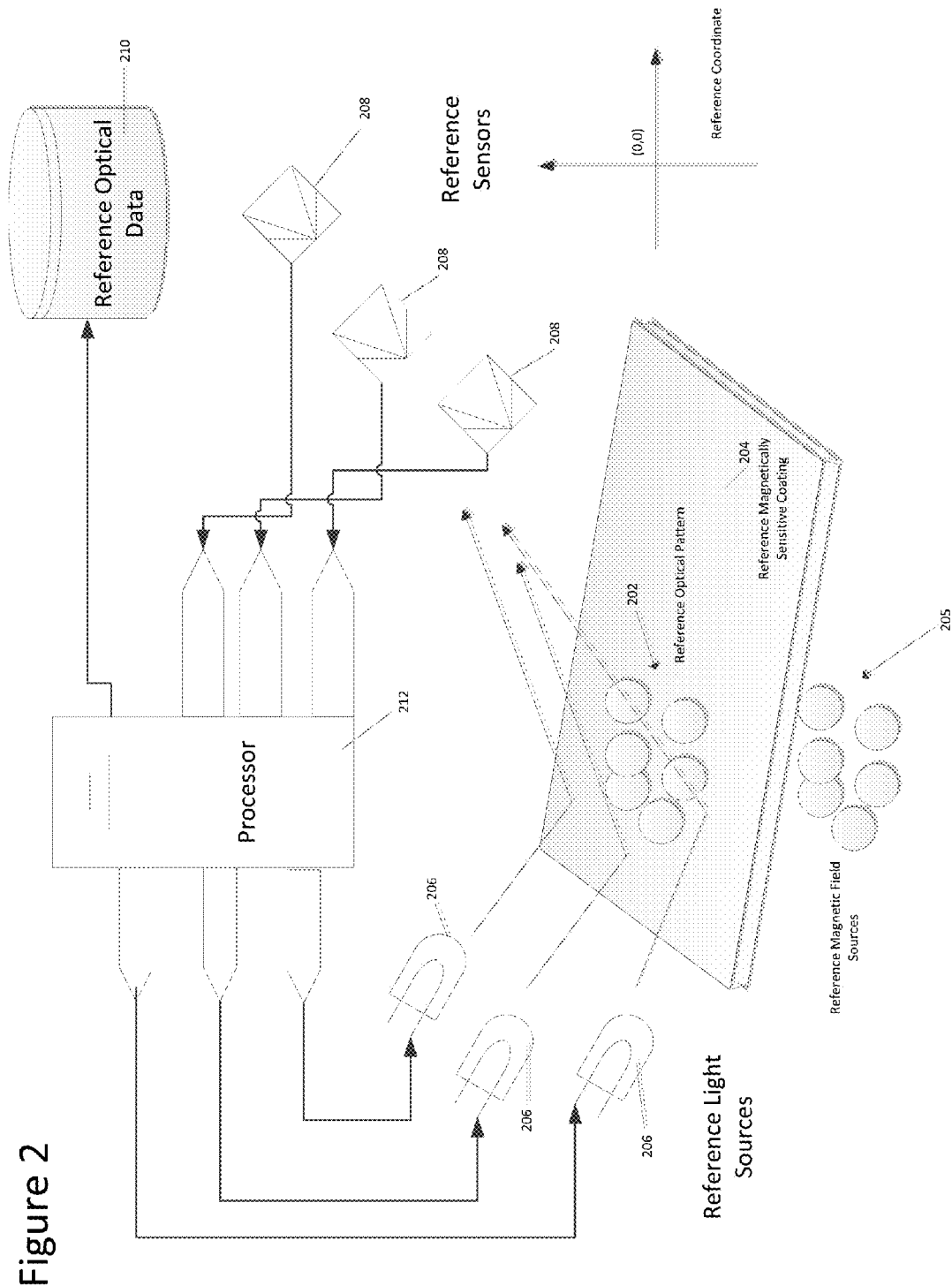
FIG. 2 depicts a system for generating reference optical data used in the authentication system of FIG. 1.

According to one embodiment, the memory 110 is configured to store a reference optical data associated with a reference optical pattern 202. As shown in FIG. 2, the reference optical pattern 202 is created by exposing a reference magnetically sensitive coating 204 to one or more reference magnetic field sources 205. The reference magnetically sensitive coating 204 has coating properties that are used as a reference for authentication purposes. Similarly, the one or more reference magnetic field sources 205 has reference magnetic field properties that impact or otherwise influence the physical attributes of the reference optical pattern. The reference optical data corresponds to data generated by one or more reference sensors 208. The reference sensors have reference sensing properties for sensing optical attributes associated with the physical attributes of the reference optical pattern 202 when the reference optical pattern is illuminated by one or more reference illumination sources 206. The one or more reference illumination sources 206 and sensors 208 have sensing and illumination properties used as reference for generating the reference optical data.

Referring back to FIG. 1, the processor 112 compares the reference optical data stored in the memory 110 to the sensed optical characteristic data after the illumination in order to authenticate the optical pattern 102. The optical pattern 102 may be a one-dimensional pattern, a two-dimensional pattern, or three-dimensional pattern. In one embodiment, the magnetic field sources comprise at least one electromagnet or electro permanent magnet for which at least one characteristic may vary over time. Varying over time may correspond to a repetition rate, a period or periods of time when one or more magnetic field sources are present, a period or periods of time when a magnetic source is not present (i.e., power to an electromagnet is off), where such varying in time of the at least one characteristic can be measured and optionally demodulated to convey information.

In some embodiments, the optical pattern 102 can convey such information as an identification code, a bar code, a Quick Response (QR) code, a logo, a number, a letter, or any other identifying symbol or symbols. The information can be used for identification and for other purposes comprising a serial number, a date of manufacturing, a location of manufacturing, etc. Such information could even identify, for example, devices used to create the optical pattern 102, an operator of the devices, the date and time of creation, or any other desired information.

The optical pattern 102 can include, for example, one or more registration marks common to all patterns that are used to determine a geometry of the optical pattern 102, for example the alignment and orientation of the optical pattern relative to a reference coordinate system. The registration marks can be used to determine, for example the relative location of illumination sources 106 or sensors 108.

Figure 3:
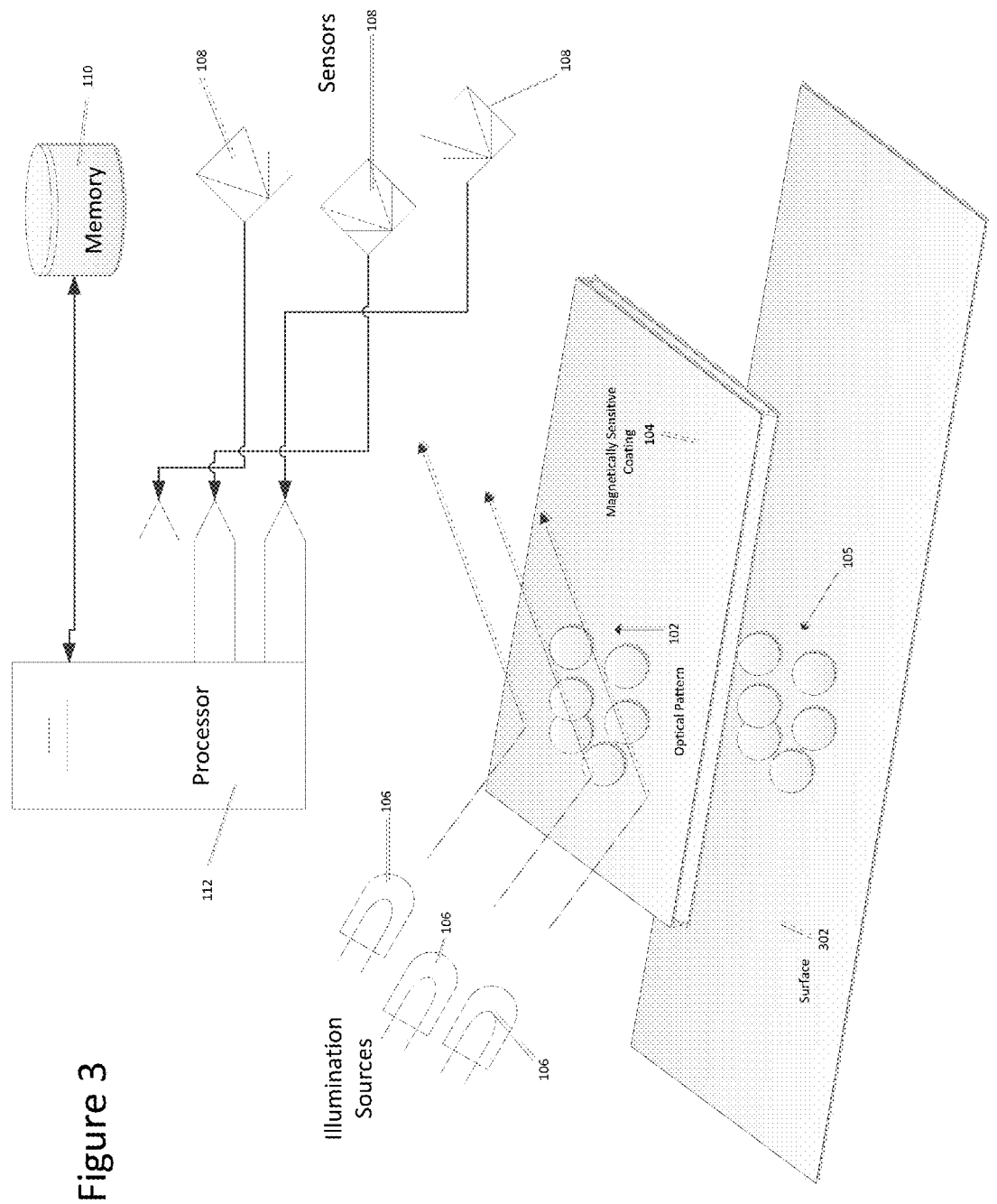
FIG. 3 depicts another embodiment of an authentication system for authenticating an optical pattern according to another aspect of the present invention.
Figure 4:
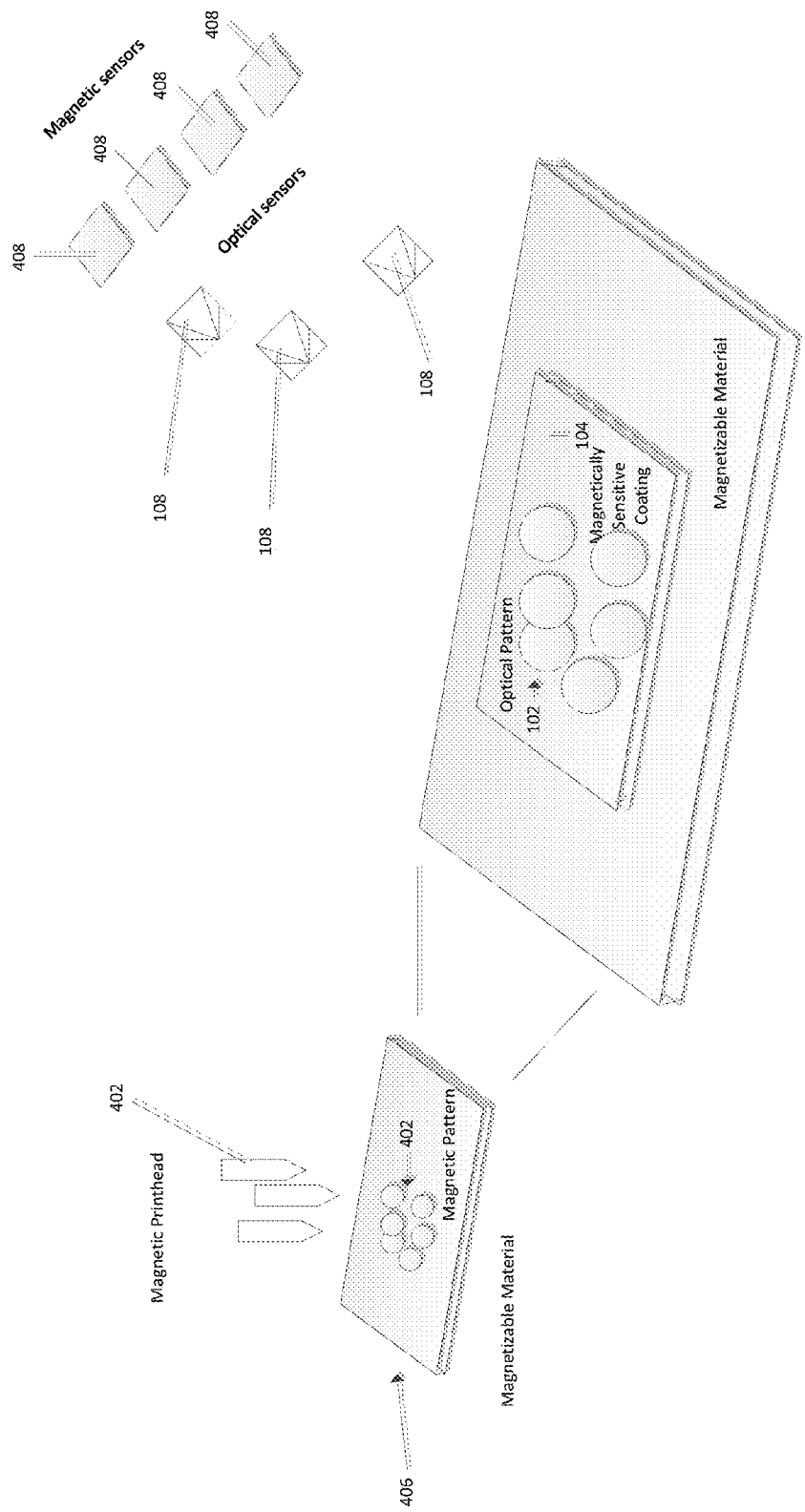
FIG. 4 depicts still another embodiment of an authentication system for authenticating an optical pattern according to another aspect of the present invention.

As shown in FIG. 3, the one or more magnetic field sources 105 can be magnetically printed onto a surface 302 of a magnetizable material onto which a magnetically sensitive coating 104 can be applied. FIG. 4 shows a set of print heads 402 imprinting a magnetic pattern 404 formed by maxels on a magnetic structure 406, which could comprise surface 302 on solid or flexible magnetizable material. A magnetically sensitive coating 104 is then applied to the magnetic structure 406 to form an optical pattern 102 that corresponds to the printed maxel pattern 404 beneath the coating 104 on the flexible or solid magnetizable material. The optical sensing approach shown in FIG. 3 could be combined with magnetic sensing using magnetic sensors, for example using a Hall Effect sensor array.

Figure 5:
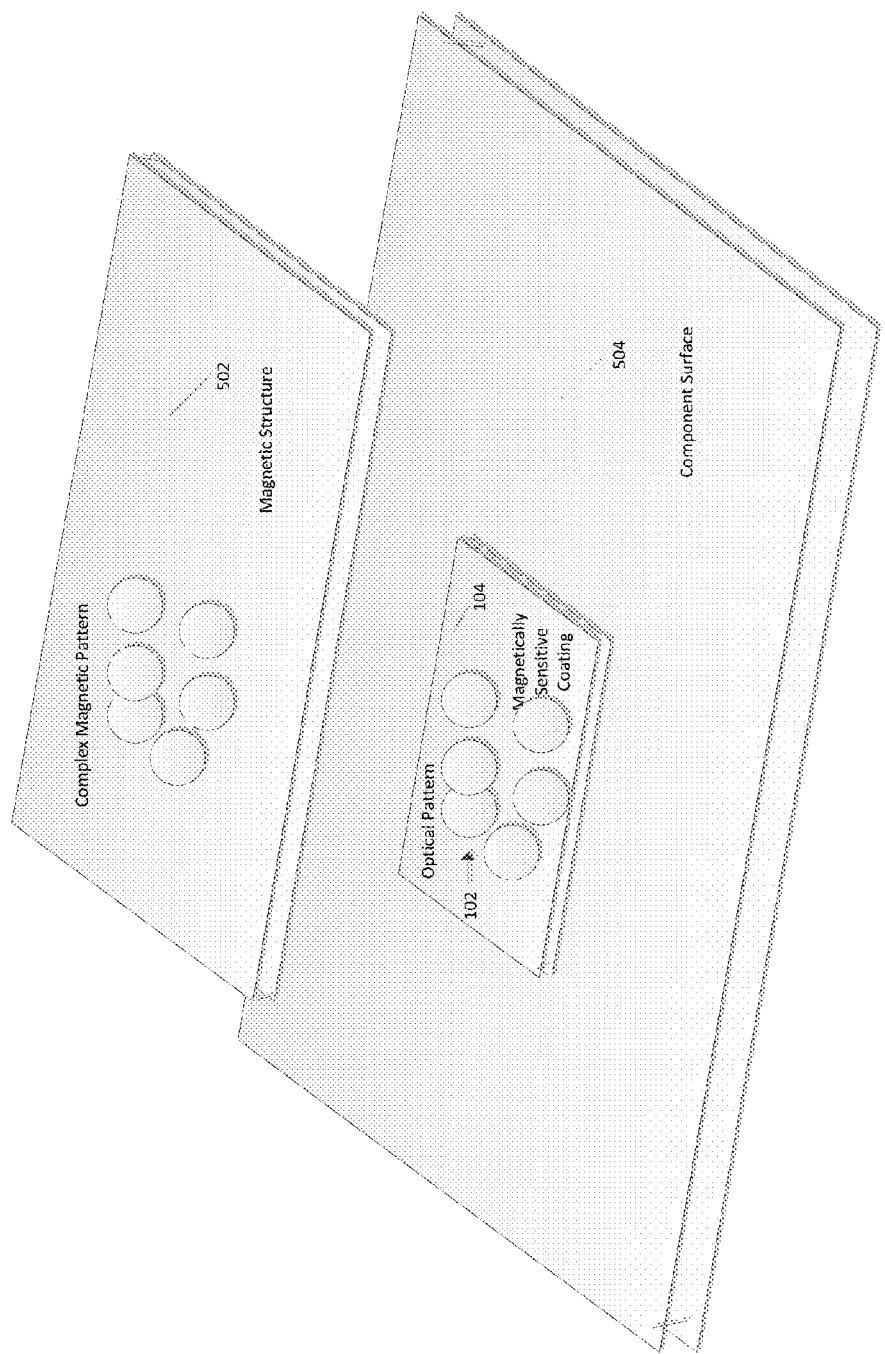
FIG. 5 depicts an embodiment of one exemplary process for creating an optical pattern on a magnetically sensitive material.

FIG. 5 shows an embodiment where a magnetic structure 502 comprising a plurality of magnetic field sources 105 having magnetic attributes such as locations, sizes, polarities, field intensities, etc. are used to expose a complex magnetic field to a magnetically sensitive coating 104 on an component 504 during the curing of the magnetically sensitive material. The magnetic field sources 105 can be discreet magnets, electromagnets, electropermanent magnets, or maxels printed into one or more pieces of magnetizable material. Under this embodiment, the magnetic structure 502, which may be made of rigid/solid or flexible material, serves as a magnetic field template for imprinting on the magnetically sensitive coating 104 an optical pattern corresponding to the complex magnetic field. For example, the magnetically sensitive coating 104 can be applied on to a number of marked components 504 based on the magnetic template by bringing the complex magnetic field of the magnetic structure 502 into proximity with the component while the magnetically sensitive coating 104 is cured.

Figure 6:
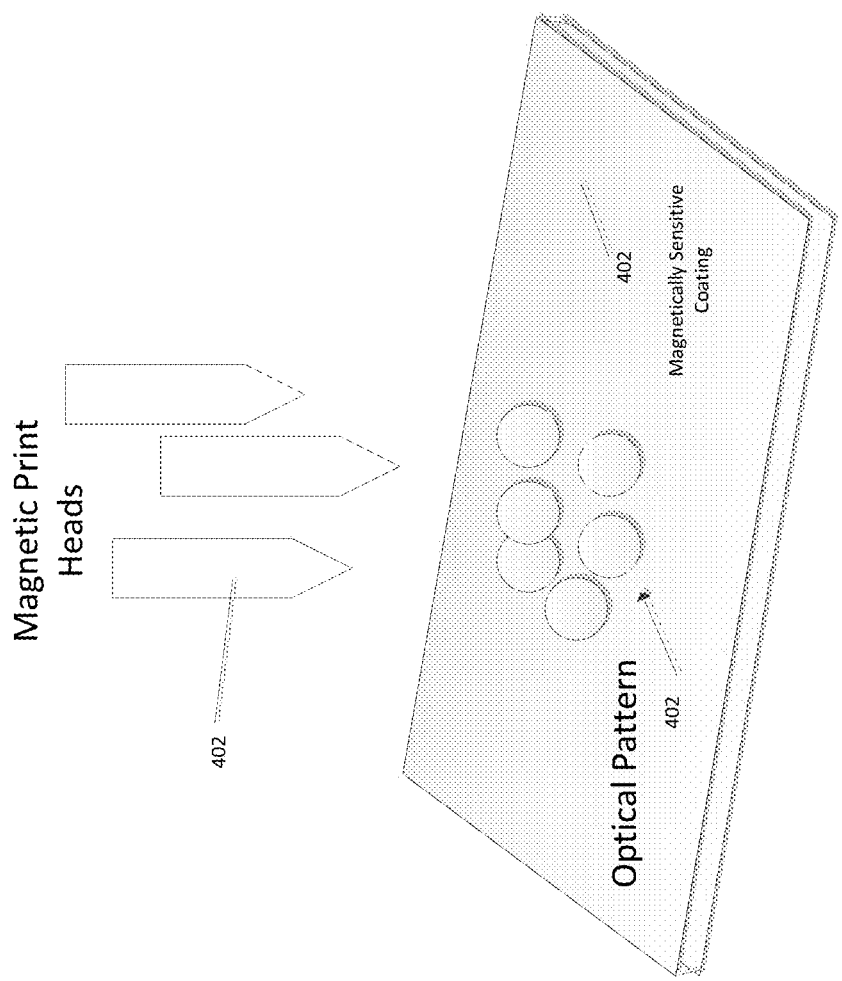
FIG. 6 depicts another embodiment of an exemplary process for creating an optical pattern on a magnetically sensitive material.

FIG. 6 shows using multiple print heads 402, electromagnets, or electropermanent magnets to produce a complex magnetic field that exposes a magnetically sensitive coating 104 during its curing process. The one or more magnetic field sources 105 can be brought into proximity to the magnetically sensitive coating 104 while the magnetically sensitive coating 104 is cured, fixed, or otherwise set. In this way, the physical attributes of the optical pattern 102 can be set in place while the magnetically sensitive field coating 104 is exposed to the one or more magnetic field sources 105, but can remain in place after the one or more magnetic field sources 105 is removed.

The one or more magnetic field sources 105 can have one or more magnetic attributes. Magnetic attributes may include position or print location, size (e.g., diameter, length, width), shape (e.g., round, square, hexagonal, etc.), polarity, field strength, print order, magnetization time, magnetization angle, or density and may involve overlapping of magnetic field sources 105 and/or magnetic field sources 105 separated by non-magnetized regions. The magnetic attributes of the one or more magnetic field sources can be varied in accordance with a code. A code may belong to a code family, for example Barker code family, Gold code family, Kasami code family, Costas code family or any other code family such as those disclosed in U.S. Pat. No. 8,179,219, issued May 15, 2012, which is incorporated herein by reference in its entirety. Alternatively, a code may be a pseudorandom code.

The sensed optical characteristic data can correspond to, for example, physical attributes of optical pattern 102 created on the magnetically sensitive coating 104, illumination attributes of one or more illumination sources 106, magnetic attributes of the one or more magnetic field sources 105, an orientation of at least one of the one or more illumination sources 106 or an orientation of at least one of the one or more sensors 108 relative to the reference coordinate.

As stated above, authentication of the optical pattern 102 can be determined or not based on a comparison of the optical characteristic data with the reference optical data. As an example, if sensed optical characteristic data for an optical pattern 102 matches reference optical data then the optical pattern 102 can be determined by processor 112 to be authentic. However, as another example, if optical characteristic data for another optical pattern also matches reference optical data, then the optical pattern 102 is treated as being counterfeited and the two optical patterns are treated as likely not being authentic.

Figure 7:
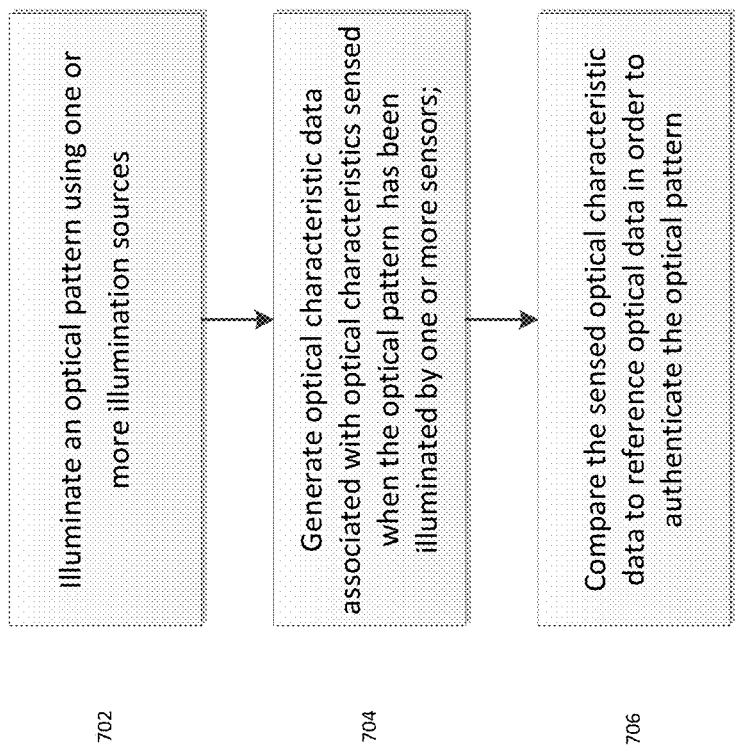
FIG. 7 depicts a flow chart of a method for authenticating an optical pattern according to one aspect of the invention.

FIG. 7 shows an embodiment of a process for authenticating an optical pattern 102 according to one aspect of the invention. At step 702, the optical pattern 102 can be illuminated using one or more illumination sources 106. At step 704, sensors 108 can generate optical characteristic data associated with optical characteristics sensed when the optical pattern 102 is illuminated by one or more illumination sources 106. At step 706, the sensed optical characteristic data can be compared to reference optical data in order to authenticate optical pattern 102. The reference optical data can be associated with a reference optical pattern created by exposing a reference magnetically sensitive coating to one or more reference magnetic field sources. The reference optical data can correspond to data generated by one or more reference sensors when the reference optical pattern is illuminated by one or more reference illumination sources.

From the foregoing it would be appreciated that the present invention can be used to create complex signatures based on optical, magnetic and orientation attributes that can for example be used to prevent purchases from unknown suppliers while creating an ability to identify the original source of components. The present invention can further be used to block the harvesting of components from assembled systems.

While particular embodiments of the invention have been described, it will be understood, however, that the invention is not limited thereto, since modifications may be made by those skilled in the art, particularly in light of the foregoing teachings.

The invention claimed is:

1. A system for authenticating, said system comprising:
   one or more illumination sources configured to illuminate an optical pattern of a magnetically sensitive material, said optical pattern having physical attributes resulting from said magnetically sensitive material having been exposed to a magnetic field during a curing process of said magnetically sensitive material, said magnetic field having been produced by a magnetizable material having been magnetically printed with one or more magnetic field sources;
   one or more sensors configured to generate sensed optical characteristic data when the optical pattern is illuminated;
   a memory configured to store a reference optical data associated with a reference optical pattern created by exposing a reference magnetically sensitive material to a reference magnetic field during a curing process of said reference magnetically sensitive material, said reference magnetic field having been produced by a reference magnetizable material having been printed with one or more reference magnetic field sources, said reference optical data corresponding to data generated by one or more reference sensors when the reference optical pattern is illuminated by one or more reference illumination sources; and
   a processor configured to access said memory and compare the reference optical data to the sensed optical characteristic data in order to authenticate the optical pattern.

2. The system of claim 1, wherein the optical characteristic data corresponds to at least one of:
   1) physical attributes of the optical pattern created on the magnetically sensitive material;
   2) illumination attributes of the one or more illumination sources;
   3) magnetic attributes of the one or more magnetic field sources
   4) an orientation of at least one of the one or more illumination sources; and
   5) an orientation of at least one of the one or more reference sensors.

3. The system of claim 2, wherein the magnetic attributes of the one or more magnetic field sources comprise at least one of a position of at least one of the one or more magnetic field sources relative to a reference coordinate, a size of at least one of the one or more magnetic field sources, a shape of at least one of the one or more magnetic field sources, a polarity of at least one of the one or more magnetic field sources, a field strength of at least one of the one or more magnetic field sources.

4. The system of claim 2, wherein the physical attributes of the optical pattern are associated with one or more lattice structures of magnetically sensitive particles suspended in the magnetically sensitive material.

5. The system of claim 2, wherein the physical attributes of the optical pattern are associated with a dichroic characteristic of the magnetically sensitive material.

6. The system of claim 1, wherein the magnetically sensitive material comprises at least one of a dichroic paint, a colloidal nanocrystal structure, or superparamagnetic photonic crystals.

7. The system of claim 2, wherein the illumination attributes of the one or more illumination sources include at least one of an intensity, a propagation direction, a frequency, a wavelength, a polarization or an illumination angle.

8. The system of claim 1, wherein the one or more sensors include at least one of a photodetector, a photocell, photodiode, a fiber optic, a pyrometer, a proximity detector, or an infrared sensor.

9. The system of claim 1, wherein the optical pattern is created by at least one of curing the magnetically sensitive material, fixing the magnetically sensitive material, or setting the magnetically sensitive material.

10. The system of claim 1, wherein the optical pattern is created by magnetically printing on a surface area of said magnetizable material and applying the magnetically sensitive material to the surface area, wherein the surface area comprises the one or more magnetic field sources.

11. The system of claim 10, wherein the magnetic field sources are arranged in a pattern in accordance with a code.

12. The system of claim 1, wherein the code is at least one of a Barker code, a Gold code, a Kasami code, a Costas code, or a pseudorandom code.

13. The system of claim 10, wherein the surface area comprises at least one of overlapping magnetic field sources or magnetic field sources separated by non-magnetized regions.

14. The system of claim 1, wherein the one or more magnetic field sources comprise at least one of electromagnets or electro permanent magnets.

15. The system of claim 2, wherein at least one of the magnetic attributes of the one or more magnetic field sources is varied over time for demodulating information conveyed by the optical pattern.

16. A method for authenticating, said method comprising:
illuminating an optical pattern of a magnetically sensitive material using one or more illumination sources, said optical pattern having physical attributes resulting from said magnetically sensitive material having been exposed to a magnetic field during a curing process of said magnetically sensitive material, said magnetic field having been produced by a magnetizable material having been magnetically printed with one or more magnetic field sources;
generating optical characteristic data associated with optical characteristics sensed when the optical pattern has been illuminated by one or more sensors; and
comparing the sensed optical characteristic data to reference optical data in order to authenticate the optical pattern, wherein the reference optical data is associated with a reference optical pattern created by exposing a reference magnetically sensitive material to a reference magnetic field during a curing process of said reference magnetically sensitive material, said reference magnetic field having been produced by a reference magnetizable material having been printed with one or more reference magnetic field sources, said reference optical data corresponding to data generated by one or more reference sensors when the reference optical pattern is illuminated by one or more reference illumination sources.

17. The method of claim 16, wherein the optical characteristic data corresponds to at least one of:
1) physical attributes of the optical pattern created on the magnetically sensitive material;
2) illumination attributes of the one or more illumination sources;
3) magnetic attributes of the one or more magnetic field sources
4) an orientation of at least one of the one or more illumination sources; and
5) an orientation of at least one of the one or more reference sensors.

18. The method of claim 17, wherein the magnetic attributes of the one or more magnetic field sources comprise at least one of a position of at least one of the one or more magnetic field sources relative to a reference coordinate, a size of at least one of the one or more magnetic field sources, a shape of at least one of the one or more magnetic field sources, a polarity of at least one of the one or more magnetic field sources, a field strength of at least one of the one or more magnetic field sources.

19. The method of claim 17, wherein the physical attributes of the optical pattern are associated with one or more lattice structures of magnetically sensitive particles suspended in the magnetically sensitive material.

20. The method of claim 17, wherein the physical attributes of the optical pattern are associated with a dichroic characteristic of the magnetically sensitive material.

21. The method of claim 17, wherein the magnetically sensitive material comprises at least one of a dichroic paint, a colloidal nanocrystal structure, or superparamagnetic photonic crystals.

22. The method of claim 17, wherein the illumination attributes of the one or more illumination sources include at least one of an intensity, a propagation direction, a frequency, a wavelength, a polarization or an illumination angle.

23. The method of claim 17, wherein the optical pattern is created by at least one of curing the magnetically sensitive material, fixing the magnetically sensitive material, or setting the magnetically sensitive material.

24. The method of claim 17, wherein the optical pattern is created by magnetically printing on a surface area of a magnetizable material and applying the magnetically sensitive material to the surface area, wherein the surface area comprises the one or more magnetic field sources.

25. The method of claim 24, wherein the magnetic field sources are arranged in a pattern in accordance with a code.

26. The method of claim 24, wherein the surface area comprises at least one of overlapping magnetic field sources or magnetic field sources separated by non-magnetized regions.

27. The method of claim 16, wherein the one or more magnetic field sources comprise at least one of electromagnets or electro permanent magnets.

28. The method of claim 17, wherein at least one of the magnetic attributes of the one or more magnetic field sources is varied over time for demodulating information conveyed by the optical pattern.

* * * * *